(12) United States Patent
Kim et al.

(10) Patent No.: US 11,725,087 B2
(45) Date of Patent: Aug. 15, 2023

(54) ANION EXCHANGE MEMBRANE BASED ON AROMATIC POLYMER FUNCTIONALIZED WITH IMIDAZOLIUM GROUP, PREPARATION METHOD THEREOF, AND VANADIUM REDOX FLOW BATTERY INCLUDING THE MEMBRANE

(71) Applicant: Research & Business Foundation Sungkyunkwan University, Suwon-si (KR)

(72) Inventors: Duk Joon Kim, Seoul (KR); Yeon Ho Ahn, Gumi-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 511 days.

(21) Appl. No.: 17/011,095

(22) Filed: Sep. 3, 2020

(65) Prior Publication Data

US 2021/0061966 A1 Mar. 4, 2021

(30) Foreign Application Priority Data

Sep. 4, 2019 (KR) .................. 10-2019-0109249

(51) Int. Cl.
*C08J 5/22* (2006.01)
*C08G 65/00* (2006.01)
*C08G 65/40* (2006.01)
*C08G 65/48* (2006.01)

(52) U.S. Cl.
CPC .......... *C08J 5/2256* (2013.01); *C08G 65/007* (2013.01); *C08G 65/4012* (2013.01); *C08G 65/48* (2013.01); *C08G 2650/40* (2013.01); *C08J 2371/10* (2013.01)

(58) Field of Classification Search
CPC ............... C08J 5/2256; C08G 65/007
See application file for complete search history.

(56) References Cited

U.S. PATENT DOCUMENTS

| | | | | |
|---|---|---|---|---|
| 6,759,441 B1 * | 7/2004 | Kerres | ........ | H01M 8/1027 521/27 |
| 6,790,553 B1 * | 9/2004 | Yamamoto | ........ | C08J 5/2256 429/304 |
| 7,037,614 B1 * | 5/2006 | Cooray | ........ | H01M 8/1027 429/314 |
| 2006/0088749 A1 * | 4/2006 | Panambur | ........ | H01M 8/1044 429/479 |

* cited by examiner

*Primary Examiner* — Sikarl A Witherspoon
(74) *Attorney, Agent, or Firm* — NSIP Law

(57) ABSTRACT

Disclosed are an anion exchange membrane based on an aromatic polymer functionalized with an imidazolium group, a preparation method thereof, and a vanadium redox flow battery including the membrane. The anion exchange membrane based on an aromatic polymer functionalized with an imidazolium group contains a compound represented by a following Chemical Formula 1:

[Chemical Formula 1]

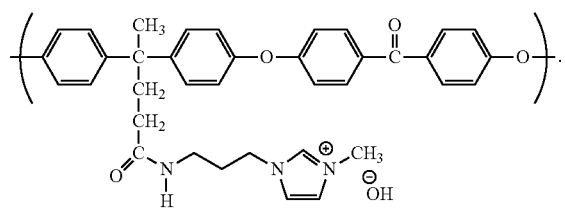

15 Claims, 6 Drawing Sheets

ANION EXCHANGE MEMBRANE BASED ON AROMATIC POLYMER FUNCTIONALIZED WITH IMIDAZOLIUM GROUP, PREPARATION METHOD THEREOF, AND VANADIUM REDOX FLOW BATTERY INCLUDING THE MEMBRANE

CROSS REFERENCE TO RELATED APPLICATIONS

This application claims the benefit under 35 USC § 119(a) of Korean Patent Application No. 10-2019-0109249 filed on Sep. 4, 2019 in the Korean Intellectual Property Office, the entire disclosure of which is incorporated herein by reference for all purposes.

BACKGROUND

1. Field

The present disclosure relates to an anion exchange membrane based on an aromatic polymer functionalized with an imidazolium group, a preparation method thereof, and a vanadium redox flow battery including the membrane. More specifically, the present disclosure relates to an anion exchange membrane containing a compound in which an imidazolium group having a long aliphatic chain is coupled to a side chain of polyarylene ether ketone (PAEK), a preparation method thereof, and a vanadium redox flow battery including the membrane.

2. Description of Related Art

An ion exchange membrane as one of components of a vanadium redox flow battery (VRFB) acts as a separator to prevent self-discharge caused due to physical mixing between electrolytes of a positive electrode and a negative electrode. At the same time, the ion exchange membrane delivers protons or sulfate ions to achieve electrical balance therebetween and thus act as an important factor that may affect overall efficiency of the battery.

A commercially available ion exchange membrane includes a cation exchange membrane based on a perfluorine-based polymer referred to as Nafion. Nafion has high chemical stability and thus has high stability in strong acidic electrolyte and has high proton conductivity. However, Nafion is expensive and has high permeability of vanadium ions having the same polarity as that of proton therethrough such that self-discharge occurs well.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One purpose according to the present disclosure is to provide an anion exchange membrane based on an aromatic polymer functionalized with an imidazolium group, and a preparation method thereof.

Another purpose according to the present disclosure is to provide a vanadium redox flow battery including the anion exchange membrane.

A first aspect of the present disclosure provides an anion exchange membrane based on an aromatic polymer functionalized with an imidazolium group, the membrane containing a compound represented by a following Chemical Formula 1:

[Chemical Formula 1]

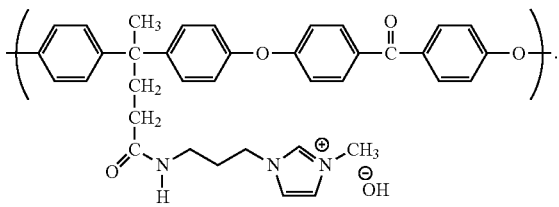

In one implementation of the first aspect, an ion exchange capacity (IEC) of the anion exchange membrane is in a range of 1.2 to 1.5 meq/g.

In one implementation of the first aspect, the anion exchange membrane has permeability of vanadium ions ($VO^{2+}$) therethrough in a range of 1.2 to 2.0 $10^{-7}$ cm$^2$/min.

In one implementation of the first aspect, the anion exchange membrane has a thickness in a range of 120 to 140 μm.

A second aspect of the present disclosure provides a method for preparing an anion exchange membrane based on an aromatic polymer functionalized with an imidazolium group, the method comprising: reacting polyarylene ether ketone (PAEK) represented by a following Chemical Formula 2 and 1-(3-aminopropyl)imidazole (API) represented by a following Chemical Formula 3 with each other to obtain a reaction product, and adding iodomethane ($CH_3I$) thereto to activate an imidazolium group therein; immersing the product having the activated imidazolium group into sodium hydroxide solution to substitute iodine ions ($I^-$) with hydroxide ions ($OH^-$) to synthesize a compound represented by a following Chemical Formula 1; and forming a membrane containing the compound represented by the following Chemical Formula 1:

[Chemical Formula 1]

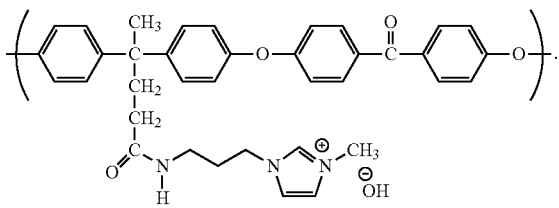

[Chemical Formula 2]

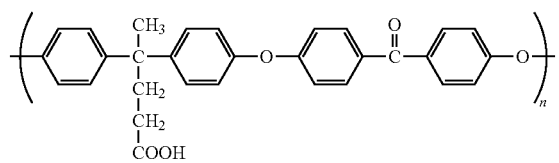

wherein in the Chemical Formula 2, n is an integer of 65 to 95,

[Chemical Formula 3]

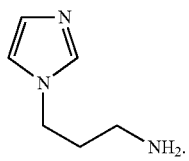

In one implementation of the second aspect, when reacting polyarylene ether ketone (PAEK) and 1-(3-aminopropyl) imidazole (API) with each other, a molar ratio between a content of polyarylene ether ketone (PAEK) and a content of 1-(3-aminopropyl) imidazole (API) is in a range of 1:1.5 to 2.0.

In one implementation of the second aspect, when reacting polyarylene ether ketone (PAEK) and 1-(3-aminopropyl) imidazole (API) with each other, a molar ratio between a content of polyarylene ether ketone (PAEK) and a content of 1-(3-aminopropyl) imidazole (API) is 1:2.0.

A third aspect of the present disclosure provides a method for preparing an anion exchange membrane based on an aromatic polymer functionalized with an imidazolium group, the method comprising: reacting polyarylene ether ketone (PAEK) represented by a following Chemical Formula 2 and N-hydroxysuccinimide (NHS) represented by a following Chemical Formula 4 to synthesize an intermediate compound represented by a following Chemical Formula 4-1; reacting the intermediate compound with 1-(3-aminopropyl)imidazole (API) represented by a following Chemical Formula 3 to obtain a reaction product, and adding iodomethane ($CH_3I$) thereto to activate an imidazolium group therein; immersing the product having the activated imidazolium group into sodium hydroxide solution to substitute iodine ions ($I^-$) with hydroxide ions ($OH^-$) to synthesize a compound represented by a following Chemical Formula 1; and forming a membrane containing the compound represented by the following Chemical Formula 1:

[Chemical Formula 1]

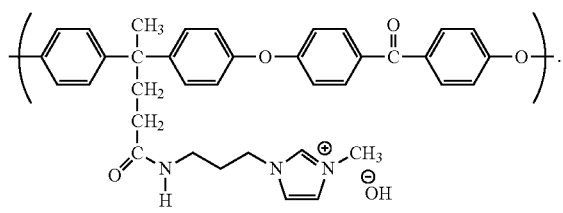

[Chemical Formula 2]

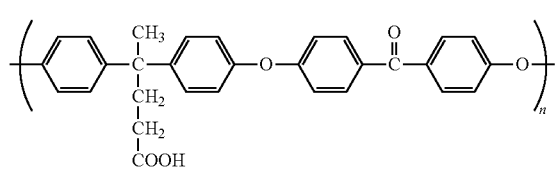

wherein in the Chemical Formula 2, n is an integer of 65 to 95,

[Chemical Formula 3]

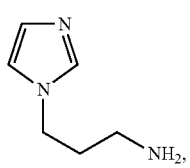

[Chemical Formula 4]

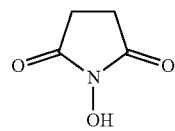

[Chemical Formula 4-1]

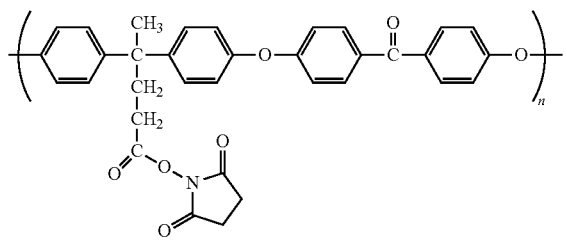

wherein in the Chemical Formula 4-1, n is an integer of 65 to 95.

In one implementation of the third aspect, when reacting the intermediate compound and 1-(3-aminopropyl)imidazole (API) with each other, a molar ratio between a content of the intermediate compound and a content of 1-(3-aminopropyl)imidazole (API) is in a range of 1:1.5 to 2.0.

In one implementation of the third aspect, when reacting the intermediate compound and 1-(3-aminopropyl)imidazole (API) with each other, a molar ratio between a content of the intermediate compound and a content of 1-(3-aminopropyl)imidazole (API) is 1:2.0.

In one implementation of the third aspect, polyarylene ether ketone (PAEK) and N-hydroxysuccinimide (NHS) react with each other under presence of dicyclohexylcarbodiimide (DCC), thereby to synthesize the intermediate compound.

In one implementation of the second aspect, polyarylene ether ketone (PAEK) is synthesized via reaction between compounds represented by a following Chemical Formula 2-1 and Chemical Formula 2-2, respectively:

[Chemical Formula 2-1]

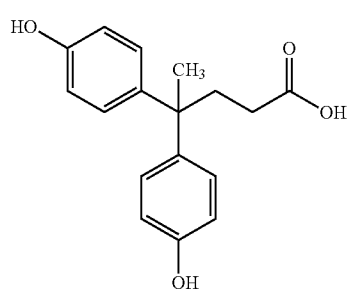

[Chemical Formula 2-2]

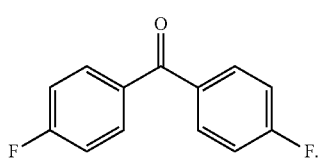

In one implementation of the third aspect, polyarylene ether ketone (PAEK) is synthesized via reaction between compounds represented by a following Chemical Formula 2-1 and Chemical Formula 2-2, respectively:

[Chemical Formula 2-1]

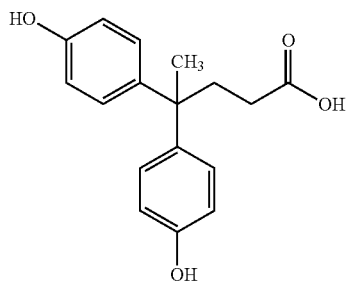

[Chemical Formula 2-2]

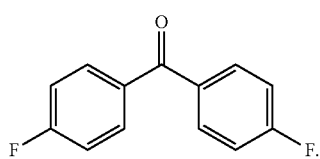

In one implementation of the second aspect, the reaction between polyarylene ether ketone (PAEK) and 1-(3-aminopropyl) imidazole (API) occurs in a dimethylacetamide (DMAc) solvent.

In one implementation of the third aspect, the reaction between the intermediate compound and 1-(3-aminopropyl) imidazole (API) occurs in a dimethylacetamide (DMAc) solvent.

A fourth aspect of the present disclosure provides a vanadium redox flow battery including the anion exchange membrane.

Effects of the present disclosure are as follows but are not limited thereto.

According to the present disclosure, the anion exchange membrane contains the compound which is based on polyarylene ether ketone (PAEK) as thermally and mechanically stable material, and which has the imidazolium group coupled to the side chain of PAEK as a functional group having the same positive charge as the positive charge of the vanadium ions. Thus, a production cost of the membrane may be reduced using an inexpensive hydrocarbon-based polymer as the base. Further, the imidazolium group may prevent the vanadium ions from easily accessing the main chain of the polymer compound, thereby to effectively lowering the permeability of vanadium ions through the membrane and reducing damage to the main chain of the polymer compound due to the vanadium ions. Thus, high chemical stability, battery efficiency, and durability of the battery may be achieved.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTIONS

Figure 1A:
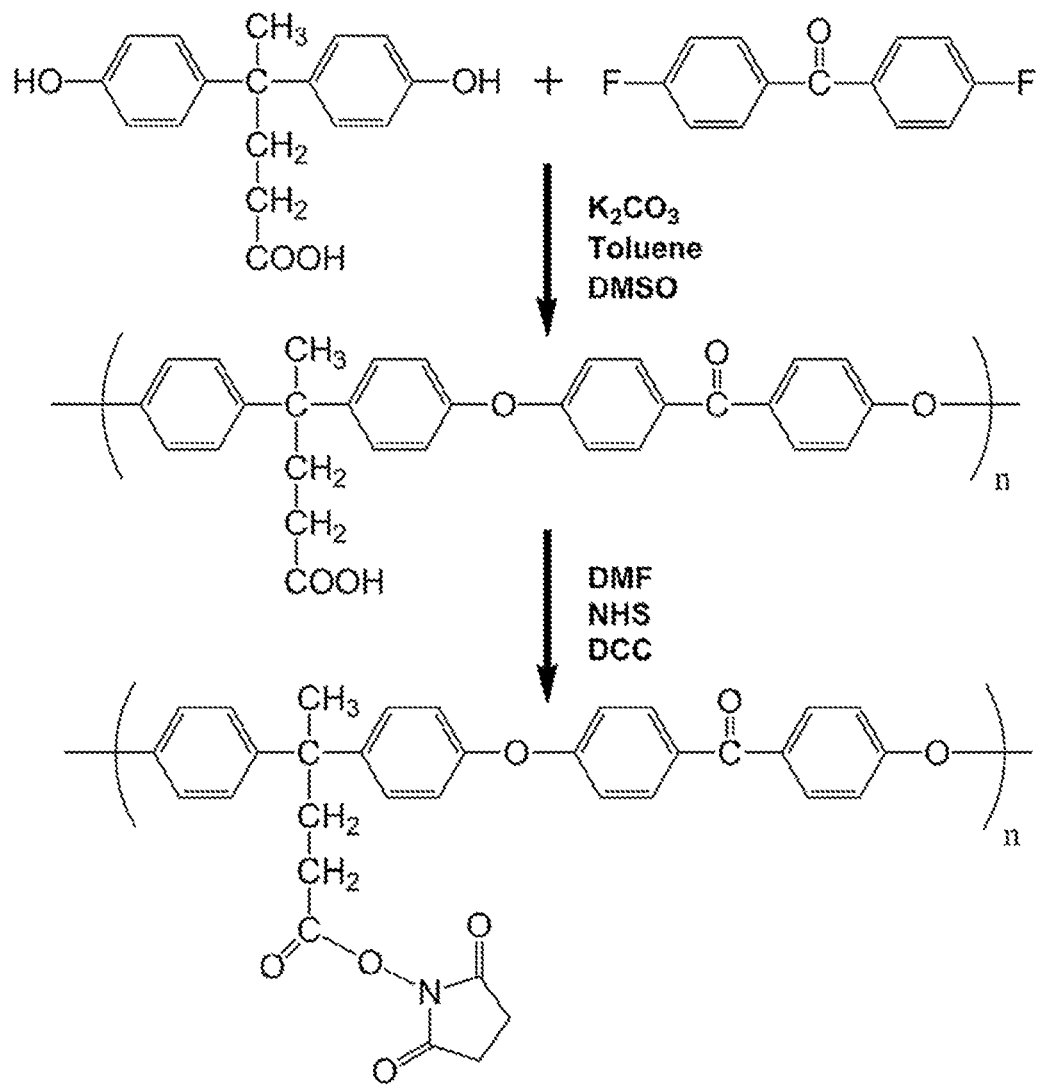
FIG. 1A and FIG. 1B are diagrams showing a synthesis reaction of an anion exchange membrane according to the present disclosure.

For simplicity and clarity of illustration, elements in the figures are not necessarily drawn to scale. The same reference numbers in different figures denote the same or similar elements, and as such perform similar functionality. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An anion exchange membrane based on an aromatic polymer functionalized with an imidazolium group according to the present disclosure contains a compound represented by a following Chemical Formula 1:

[Chemical Formula 1]

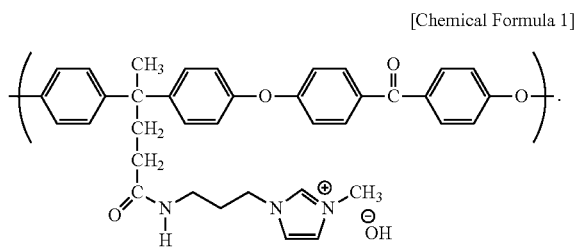

Specifically, the compound represented by the Chemical Formula 1 has a structure in which a main chain thereof is polyarylene ether ketone (PAEK) as a thermally and mechanically stable hydrocarbon-based polymer, and the imidazolium group having a long aliphatic chain is introduced to a side chain thereof.

The polyarylene ether ketone (PAEK) is a hydrocarbon-based polymer, and is thermally and mechanically stable, and is inexpensive to reduce the production cost of the anion exchange membrane.

The imidazolium group introduced to the side chain of the PAEK has the same positive charge as a positive charge of the vanadium ions upon activation thereof and thus prevents the vanadium ions from accessing the anion exchange membrane due to a repulsive force between cation and cation based on a Donnan exclusion mechanism.

Thus, the permeability of the vanadium ions through the anion exchange membrane according to the present disclosure may be lowered, thereby to improve the efficiency of the vanadium redox flow battery, and to reduce the damage to the main chain of the polymer due to the vanadium ions. In this way, the chemical stability and durability of the anion exchange membrane may be improved.

In one embodiment, the ion exchange capacity (IEC) of the anion exchange membrane may be in a range of 1.2 to 1.5 meq/g. The anion exchange membrane may have the permeability of the vanadium ions ($VO^{2+}$) therethrough in a range of 1.2 to 2.0 $10^{-7} cm^2/min$.

In one embodiment, the anion exchange membrane may have a thickness in a range of 120 to 140 μm.

The anion exchange membrane according to the present disclosure contains the compound which is based on polyarylene ether ketone (PAEK) as thermally and mechanically stable material, and which has the imidazolium group coupled to the side chain of PAEK as a functional group having the same positive charge as the positive charge of the vanadium ions. Thus, a production cost of the membrane may be reduced using an inexpensive hydrocarbon-based polymer as the base. Further, the imidazolium group may prevent the vanadium ions from easily accessing the main chain of the polymer compound, thereby to effectively lowering the permeability of vanadium ions through the membrane and reducing damage to the main chain of the polymer compound due to the vanadium ions. Thus, high chemical stability, battery efficiency, and durability of the battery may be achieved.

Further, a method for preparing an anion exchange membrane based on an aromatic polymer functionalized with an imidazolium group may include reacting polyarylene ether ketone (PAEK) represented by a following Chemical Formula 2 and 1-(3-aminopropyl)imidazole (API) represented by a following Chemical Formula 3 with each other to obtain a reaction product, and adding iodomethane ($CH_3I$) thereto to activate an imidazolium group therein; immersing the product having the activated imidazolium group into sodium hydroxide solution to substitute iodine ions ($I^-$) with hydroxide ions ($OH^-$) to synthesize a compound represented by a following Chemical Formula 1; and forming a membrane containing the compound represented by the following Chemical Formula 1:

[Chemical Formula 1]

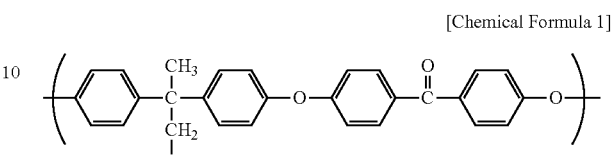

[Chemical Formula 2]

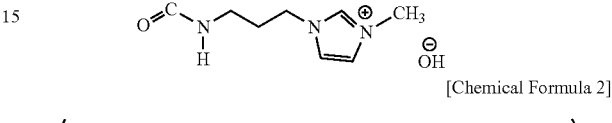

wherein in the Chemical Formula 2, n is an integer of 65 to 95,

[Chemical Formula 3]

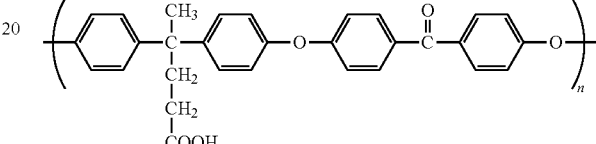

First, polyarylene ether ketone (PAEK) represented by the Chemical Formula 2 and 1-(3-aminopropyl)imidazole (API) represented by the Chemical Formula 3 react with each other to obtain the reaction product. Then, the product is activated using iodomethane ($CH_3I$).

Specifically, 1-(3-aminopropyl)imidazole (API) is added to a solution containing polyarylene ether ketone (PAEK) to form a mixed solution which in turn is stirred at room temperature for 22 to 25 hours to react polyarylene ether ketone (PAEK) and 1-(3-aminopropyl)imidazole (API) with each other to obtain a reaction product. Then, iodomethane ($CH_3I$) is added to the resulting product, followed by stirring for 22 to 25 hours at a temperature of 30 to 50° C. in a dark place, such that the imidazolium group may be activated.

In this connection, the polyarylene ether ketone (PAEK) and 1-(3-aminopropyl) imidazole (API) are preferably contained in a molar ratio of 1:1.5 to 2.0. When the molar ratio between contents of polyarylene ether ketone (PAEK) and 1-(3-aminopropyl)imidazole (API) exceeds 1:2.0, hydrophilicity of the synthesized anion exchange membrane increases, and thus ionic conductivity, moisture content, and swelling percentage thereof increase, such that there may be a problem in that the ionic permeability of vanadium ions through the membrane is excessively high. To the contrary, when the molar ratio between contents of polyarylene ether ketone (PAEK) and 1-(3-aminopropyl)imidazole (API) is below 1:1.5, an amount of 1-(3-aminopropyl)imidazole (API) introduced to the main chain of the PAEK is insignificant, such that the vanadium ions may easily access the main chain of the resulting polymer due to the Donnan exclusion phenomenon.

Therefore, in order to prevent the permeability of the vanadium ions therethrough from being high while the anion exchange membrane according to the present disclosure has high electrical efficiency (EE), the polyarylene ether ketone (PAEK) and 1-(3-aminopropyl)imidazole (API) are most preferably contained in a molar ratio of 1:2.0.

Further, the reaction between polyarylene ether ketone (PAEK) and 1-(3-aminopropyl) imidazole (API) may occur in a dimethylacetamide (DMAc) solvent. However, the present disclosure is not limited thereto.

In addition, the polyarylene ether ketone (PAEK) may be synthesized via a reaction between a compound represented by a following Chemical Formula 2-1 and a compound represented by a following Chemical Formula 2-2:

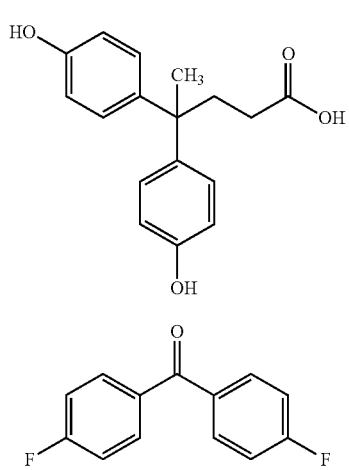

[Chemical Formula 2-1]

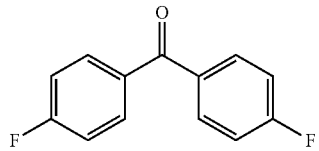

[Chemical Formula 2-2]

Specifically, 4,4'-bis(4-hydroxyphenyl)-valeric acid represented by the Chemical Formula 2-1 and potassium carbonate ($K_2CO_3$) are added to a DMSO/toluene mixed solvent, and reaction occurs to obtain a reaction mixture. Then, a DMSO solution containing 4,4'-difluorobenzophenone represented by the Chemical Formula 2-2 is added to the reaction mixture which in turn is maintained at 160 to 170° C. for 16 to 20 hours such that a polycondensation reaction occurs.

Next, the method includes immersing the product having the activated imidazolium group into sodium hydroxide solution to substitute iodine ions ($I^-$) with hydroxide ions ($OH^-$) to synthesize the compound represented by the Chemical Formula 1.

Specifically, the product having the activated imidazolium group is immersed in 1M sodium hydroxide solution to replace iodine ions ($I^-$) with hydroxide ions ($OH^-$), resulting in the synthesis of the compound represented by the Chemical Formula 1.

Thereafter, the method includes forming a membrane containing the compound represented by the Chemical Formula 1.

Specifically, the compound represented by the Chemical Formula 1 is cast on a substrate such as a Petri dish, and is first dried in a vacuum oven for one day at a temperature of about 60° C. and then second dried for one day at a temperature of about 80° C. Thus, the membrane is obtained.

Figure 1B:
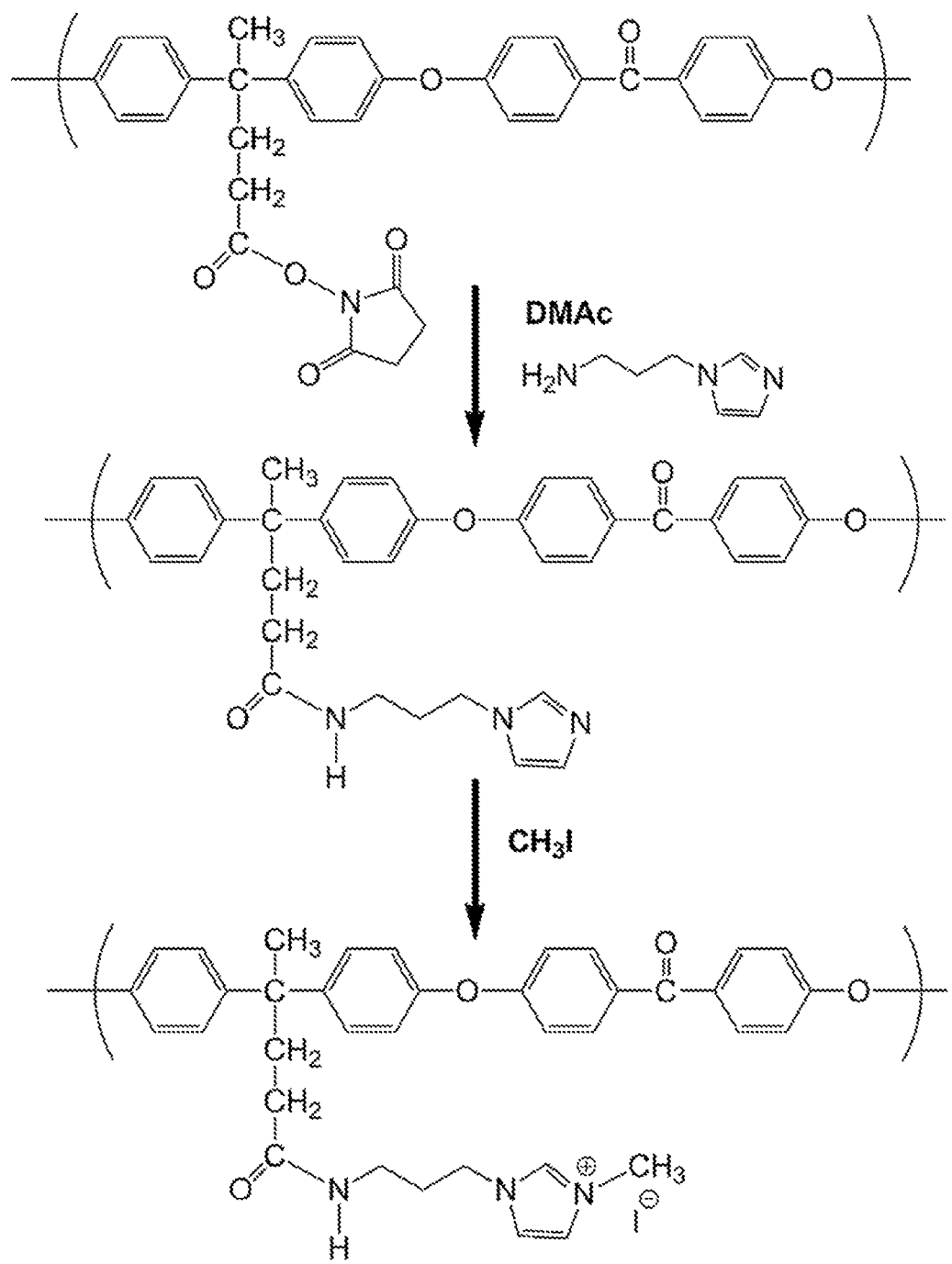

In another aspect, referring to FIG. 1A and FIG. 1B, a method for preparing an anion exchange membrane based on an aromatic polymer functionalized with an imidazolium group includes reacting polyarylene ether ketone (PAEK) represented by a following Chemical Formula 2 and N-hydroxysuccinimide (NHS) represented by a following Chemical Formula 4 to synthesize an intermediate compound represented by a following Chemical Formula 4-1; reacting the intermediate compound with 1-(3-aminopropyl)imidazole (API) represented by a following Chemical Formula 3 to obtain a reaction product, and adding iodomethane ($CH_3I$) thereto to activate an imidazolium group therein; immersing the product having the activated imidazolium group into sodium hydroxide solution to substitute iodine ions ($I^-$) with hydroxide ions ($OH^-$) to synthesize a compound represented by a following Chemical Formula 1; and forming a membrane containing the compound represented by the following Chemical Formula 1:

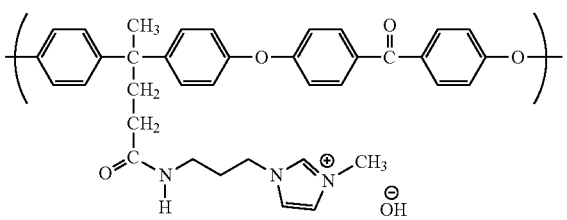

[Chemical Formula 1]

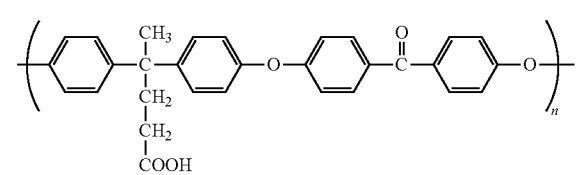

[Chemical Formula 2]

wherein in the Chemical Formula 2, n is an integer of 65 to 95,

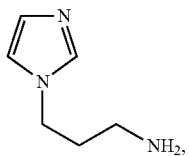

[Chemical Formula 3]

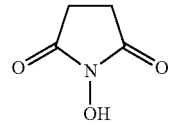

[Chemical Formula 4]

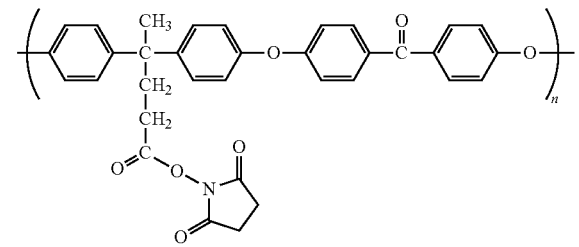

[Chemical Formula 4-1]

wherein in the Chemical Formula 4-1, n is an integer of 65 to 95.

First, referring to FIG. 1A, the method includes reacting polyarylene ether ketone (PAEK) represented by the Chemical Formula 2 and N-hydroxysuccinimide (NHS) represented by the Chemical Formula 4 to synthesize an intermediate compound represented by the Chemical Formula 4-1.

In this connection, in the step of synthesizing the intermediate compound, it is preferable to react the polyarylene ether ketone (PAEK) and N-hydrosuccinimide with each other under presence of dicyclohexylcarbodiimide (DCC).

Specifically, each of polyarylene ether ketone (PAEK) and N-hydrosuccinimide (NETS) is dissolved in a DMF solvent. Then, the PAEK solution and the NHS solution are mixed with each other and are stirred at room temperature for about 4 to 6 hours. Then, a DMF solution containing dicyclohexylcarbodiimide (DCC) is added thereto, followed by stirring for about 12 hours, such that the intermediate compound may be synthesized.

Next, referring to FIG. 1B, the method includes reacting the intermediate compound with 1-(3-aminopropyl)imidazole (API) represented by a following Chemical Formula 3 to obtain a reaction product, and adding iodomethane (CH$_3$I) thereto to activate an imidazolium group therein.

Specifically, 1-(3-aminopropyl)imidazole (API) is added to a solution containing the intermediate compound to obtain a mixed solution which in turn is stirred at room temperature for 22 to 25 hours to react the intermediate compound and 1-(3-aminopropyl)imidazole (API) with each other to obtain a reaction product. Then, iodomethane (CH$_3$I) is added to the resulting product, followed by stirring for 22 to 25 hours at a temperature of 30 to 50° C. in a dark place, such that the imidazolium group is activated.

In this connection, the intermediate compound and 1-(3-aminopropyl) imidazole (API) are preferably contained in a molar ratio of 1:1.5 to 2.0. When the molar ratio between contents of intermediate compound and 1-(3-aminopropyl) imidazole (API) exceeds 1:2.0, hydrophilicity of the synthesized anion exchange membrane increases, and thus ionic conductivity, moisture content, and swelling percentage thereof increase, such that there may be a problem in that the ionic permeability of vanadium ions through the membrane is excessively high. To the contrary, when the molar ratio between contents of intermediate compound and 1-(3-aminopropyl)imidazole (API) is below 1:1.5, an amount of 1-(3-aminopropyl)imidazole (API) introduced to the main chain of the resulting polymer is insignificant, such that the vanadium ions may easily access the main chain of the resulting polymer due to the Donnan exclusion phenomenon.

Therefore, in order to prevent the permeability of the vanadium ions therethrough from being high while the anion exchange membrane according to the present disclosure has high electrical efficiency (EE), the intermediate compound and 1-(3-aminopropyl)imidazole (API) are most preferably contained in a molar ratio of 1:2.0.

In on embodiment, the reaction between the intermediate compound and 1-(3-aminopropyl) imidazole (API) may occur in a dimethylacetamide (DMAc) solvent.

In one embodiment, polyarylene ether ketone (PAEK) and N-hydroxysuccinimide (NHS) react with each other under presence of dicyclohexylcarbodiimide (DCC), thereby to synthesize the intermediate compound.

In addition, the polyarylene ether ketone (PAEK) may be synthesized via a reaction between a compound represented by a following Chemical Formula 2-1 and a compound represented by a following Chemical Formula 2-2:

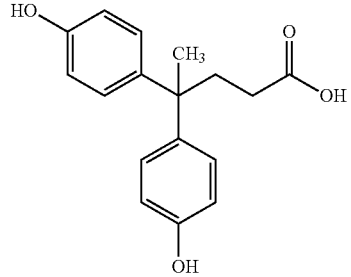

[Chemical Formula 2-1]

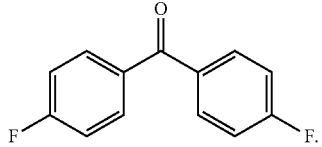

[Chemical Formula 2-2]

Specifically, 4,4'-bis(4-hydroxyphenyl)-valeric acid represented by the Chemical Formula 2-1 and potassium carbonate (K$_2$CO$_3$) are added to a DMSO/toluene mixed solvent, and reaction occurs to obtain a reaction mixture. Then, a DMSO solution containing 4,4'-difluorobenzophenone represented by the Chemical Formula 2-2 is added to the reaction mixture which in turn is maintained at 160 to 170° C. for 16 to 20 hours such that a polycondensation reaction occurs.

Next, the method includes immersing the product having the activated imidazolium group into sodium hydroxide solution to substitute iodine ions (I$^-$) with hydroxide ions (OH$^-$) to synthesize the compound represented by the Chemical Formula 1.

Specifically, the product having the activated imidazolium group is immersed in 1M sodium hydroxide solution to replace iodine ions (I$^-$) with hydroxide ions (OH$^-$), resulting in the synthesis of the compound represented by the Chemical Formula 1.

Thereafter, the method includes forming a membrane containing the compound represented by the Chemical Formula 1.

Specifically, the compound represented by the Chemical Formula 1 is cast on a substrate such as a Petri dish, and is first dried in a vacuum oven for one day at a temperature of about 60° C. and then second dried for one day at a temperature of about 80° C. Thus, the membrane is obtained.

Still another aspect of the present disclosure may provide a vanadium redox flow battery containing the anion exchange membrane prepared by the preparation method. The battery includes the anion exchange membrane having a low vanadium ion permeability, and thus may have a high charge efficiency (CE) of 95% or greater, and may exhibit an electrical efficiency (EE) of 83% or greater.

Hereinafter, various Examples and Experimental Examples according to the present disclosure will be described in detail. However, the following Examples are only some examples according to the present disclosure, and the present disclosure should not be interpreted as being limited to the following Examples.

Synthesis of Poly(Arylene Ether Ketone) (PAEK)

Polyarylene ether ketone (PAEK) having a carboxyl group is synthesized via a polycondensation reaction between 4,4'-bis(4-hydroxyphenyl)-valeric acid and 4,4'-difluorobenzophenone.

4,4'-bis(4-hydroxyphenyl)-valeric acid (15 mmol), potassium carbonate (K$_2$CO$_3$) (45 mmol), DMSO (100 mL), and toluene (50 mL) were added to a 250 mL 3-neck round-bottom flask equipped with a Dean-Stark trap and mixed with each other. The mixture was stirred for 4 hours under a nitrogen atmosphere using a mechanical stirrer. Thereafter, the reaction mixture was refluxed for 4 hours at a temperature of 145° C., and cooled at room temperature.

Next, a DMSO solution (30 mL) containing 4,4'-difluorobenzophenone (15 mmol) was added to the mixture, and the mixture was raised to a temperature of 165° C. and maintained for 18 hours to obtain a product.

The product was cooled at room temperature, and then a precipitated polymer material was dissolved in a mixture of 30 mL of THF and 4 mL of HCL (35.6 wt %), and then the polymer solution was dripped into 2-propanol while stirring vigorously the same to precipitate the same. Thereafter, the product was washed three times with 2-propanol and two times with distilled water, and dried under vacuum at a temperature of 60° C. to obtain PAEK in a yield of 81%.

A number average molecular weight and a weight average molecular weight of the resulting PAEK as measured using gel permeation chromatography were 2.9×10$^4$ gmol$^{-1}$ and 6.3×10$^4$ gmol$^{-1}$, respectively (GPC, Agilent 1100S, Agilent, California, USA).

Intermediate Compound (PAEK-NHS) Synthesis

PAEK (10 mmol), N-hydroxysuccinimide (NHS, 12 mmol), and dicyclohexylcarbodiimide (DCC, 12 mmol) were dissolved in 30 mL, 6 mL and 6 mL of DMF, respectively. Then, the PAEK solution and the NHS solution were mixed with each other and stirred at room temperature for 5 hours to obtain a reaction mixture. Then, the DCC solution was added to the reaction mixture which in turn was stirred for 12 hours to obtain a polymer solution.

Thereafter, the polymer solution was precipitated in 2-propanol to obtain an intermediate compound (PAEK-NHS) as a product which in turn was washed three times with 2-propanol, and then vacuum-dried at 40° C. Thus, PAEK-NHS was obtained in a yield of 86% based on PAEK (See FIG. 1A).

PAEK-API Synthesis

The PAEK-NHS was dissolved in DMAc and stirred for 2 hours. Then, 2 mol, 1.75 mol and 1.5 mol of 1-(3-aminopropyl)imidazole (API) based on 1 mol of PAEK-NHS were added thereto to obtain three mixtures. Thereafter, the three mixtures were stirred at room temperature for 24 hours to replace NHS with an imidazole group.

After completion of the reaction, each of three reaction solutions was precipitated in 2-propanol, and each of three products was washed three times with 2-propanol, and then vacuum-dried at a temperature of 60° C. Thus, Example 1 (PAEK-API 2.0), Example 2 (PAEK-API 1.75), and Example 3 (PAEK-API 1.5) were obtained (See FIG. 1B).

Preparation of Anion Exchange Membrane 0.3 g of each of Examples 1 to 3 was dissolved in DMAc, and iodomethane (2 mL) was added thereto, followed by stirring at a temperature of 40° C. for 24 hours in a dark place for quaternization. Then, each product was immersed in 1M sodium hydroxide solution such that iodine ions (I$^-$) were replaced with hydroxide ions (OH$^-$), thereby to obtain each compound.

Next, each compound was cast onto a Petri dish and dried in a vacuum oven at a temperature of 60° C. for 24 hours, and was further dried for 24 hours at a temperature of 80° C., such that an anion exchange membrane containing each of Examples 1 to 3 was prepared.

Then, each anion exchange membrane was separated from the Petri dish, washed thoroughly with deionized water, and stored in deionized water.

Ion Conductivity and Ion Exchange Capacity (IEC) of Anion Exchange Membrane

Figure 2:
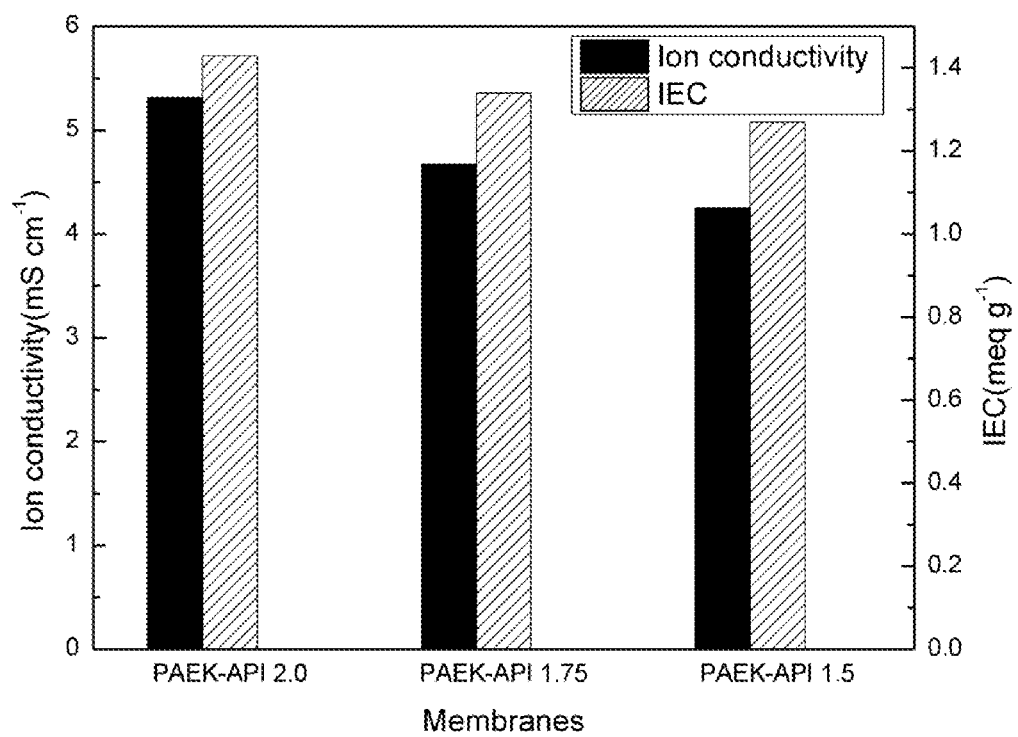
FIG. 2 is a diagram showing results of measuring ion conductivity and ion exchange capacity of an anion exchange membrane according to Example of the present disclosure.

FIG. 2 is a diagram showing results of measuring the ion conductivity and the ion exchange capacity of the anion exchange membrane according to Examples according to the present disclosure.

Referring to FIG. 2, it may be seen that the ionic conductivity and ion exchange capacity of the anion exchange membrane increase as the molar content of the added 1-(3-aminopropyl)imidazole (API) increases. This is because as the molar content of API increases, the hydrophilicity of the anion exchange membrane becomes stronger, thereby to easily form a cluster capable of transferring ions.

Further, a following Table 1 shows a substitution percentage, a moisture content, and a swelling percentage based on the molar content of the API added to the prepared anion exchange membrane.

TABLE 1

| Anion exchange membrane | Substitution percentage (%) | Moisture content (%) | Swelling percentage (%) |
|---|---|---|---|
| Example 1 (PAEK-API 2.0) | 86.2 | 36.8 | 18.4 |
| Example 2 (PAEK-API 1.75) | 80.8 | 32.5 | 15.3 |
| Example 3 (PAEK-API 1.5) | 76.5 | 28.7 | 12.2 |
| Nafion ® 117 | — | 10.3 | 3.4 |

As shown in Table 1, as the molar content of the added API increased, the substitution percentage was increased, and the moisture content and the swelling percentage were increased.

In this connection, it is believed that because the API is hydrophilic, and thus as the amount of the added API increases, the moisture content increases, and thus the swelling percentage of the anion exchange membrane increases. This has a similar trend to that of the ionic conductivity as presented above.

Vanadium Ion Permeability

The permeability of the vanadium ions is a main factor that lowers the efficiency by causing a self-discharge reaction at each of electrodes of the vanadium redox flow battery. Accordingly, the permeability of the vanadium ions through the anion exchange membrane according to Examples of the present disclosure and a commercially available Nafion membrane were measured, and the results are shown in Table 2 below.

TABLE 2

| Anion exchange membrane | Thickness (μm) | VO$^{2+}$ permeability (10$^{-7}$ cm$^2$min$^{-1}$) |
|---|---|---|
| Example 1 (PAEK-API 2.0) | 133 | 1.91 |
| Example 2 (PAEK-API 1.75) | 129 | 1.57 |
| Example 3 (PAEK-API 1.5) | 125 | 1.31 |
| Nafion ® 117 | 182 | 20.28 |

Referring to Table 2, the permeabilities (10$^{-7}$ cm$^2$/min) of the vanadium ions through Examples 1 to 3 were measured as 1.91, 1.57, and 1.31, respectively. The permeability of the vanadium ions through the commercially available Nafion membrane was measured as 20.28. All of the anion exchange membranes of Examples 1 to 3 are identified to have the vanadium ion permeability significantly lower than that of the Nafion membrane.

This is due to the fact that the imidazolium group as a functional group has the same positive charge as the positive charge of the vanadium ions, thereby reducing the permeation of the vanadium ions via electrostatic repulsion, and further, PAEK according to the present disclosure as an aromatic hydrocarbon-based polymer is less flexible, such that in the anion exchange membrane according to the present disclosure based on the PAEK, a cluster smaller than that in the Nafion membrane is created.

On the contrary, as the addition amount of API which is hydrophilic increases based on a content of PAEK as the main chain, a larger cluster is created such that the permeability of vanadium ions through the anion exchange membrane according to the present disclosure increases.

Chemical Stability

Figure 3:
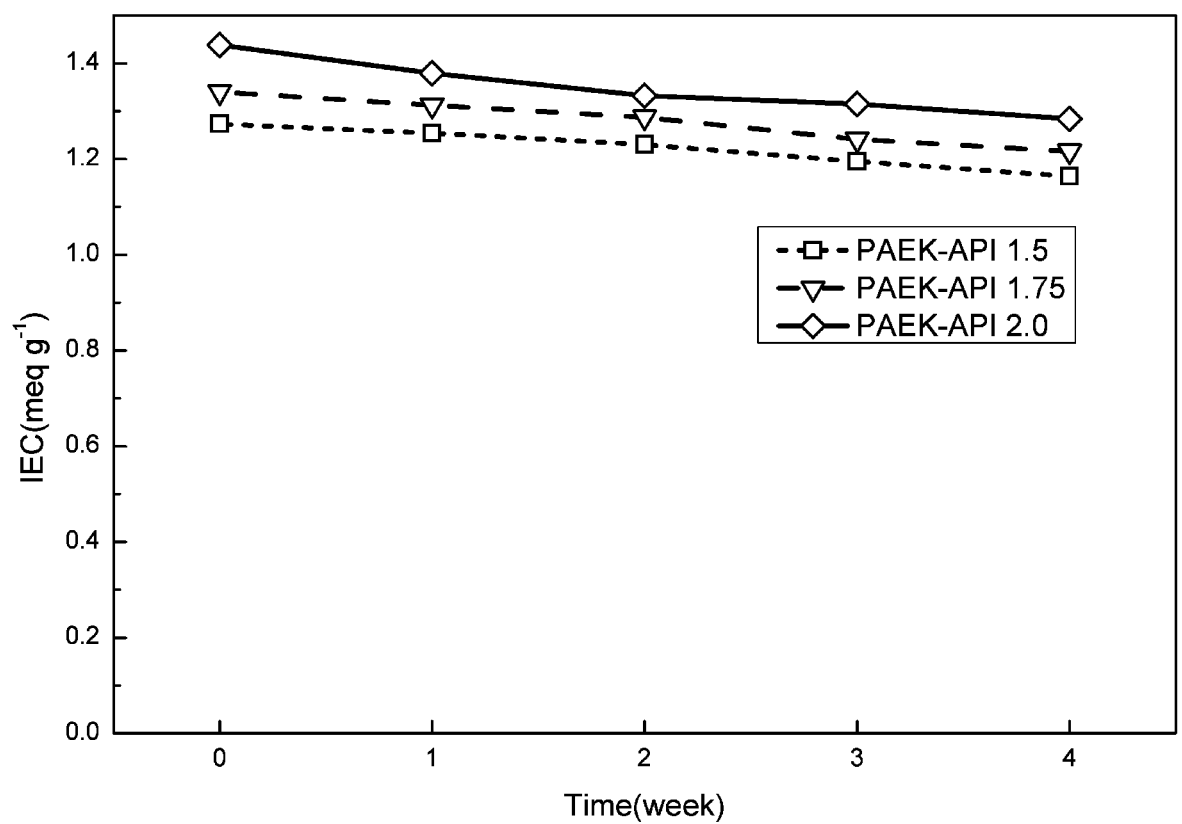
FIG. 3 is a diagram showing a result of measuring change in ion exchange capacity when immersing the anion exchange membrane according to Example of the present disclosure in a 1.5 M $V^{5+}$/3M $H_2SO_4$ solution for 4 weeks, and measuring the change in the ion exchange capacity thereof at one week interval.

To identify the chemical stability of the anion exchange membrane according to the Examples of the present disclosure, each anion exchange membrane was immersed in a 1.5 M $V^{5+}$/3M $H_2SO_4$ solution for 4 weeks and then change in ion exchange capacity thereof was measured at one week interval and a result is shown in FIG. 3.

As shown in FIG. 3, the change in the ion exchange capacity of the anion exchange membrane for 4 weeks was 0.07 to 0.09 meq $g^{-1}$ corresponding to only about 5 to 8% of that before the immersion. Thus, it is identified that the chemical stability of the anion exchange membrane according to Examples of the present disclosure is excellent.

Efficiency of Vanadium Redox Flow Battery (VRFB) Including Anion Exchange Membrane The anion exchange membrane according to each of Examples of the present disclosure was applied to a single cell of the vanadium redox flow battery (VRFB). Efficiency of the battery was measured.

Figure 4:
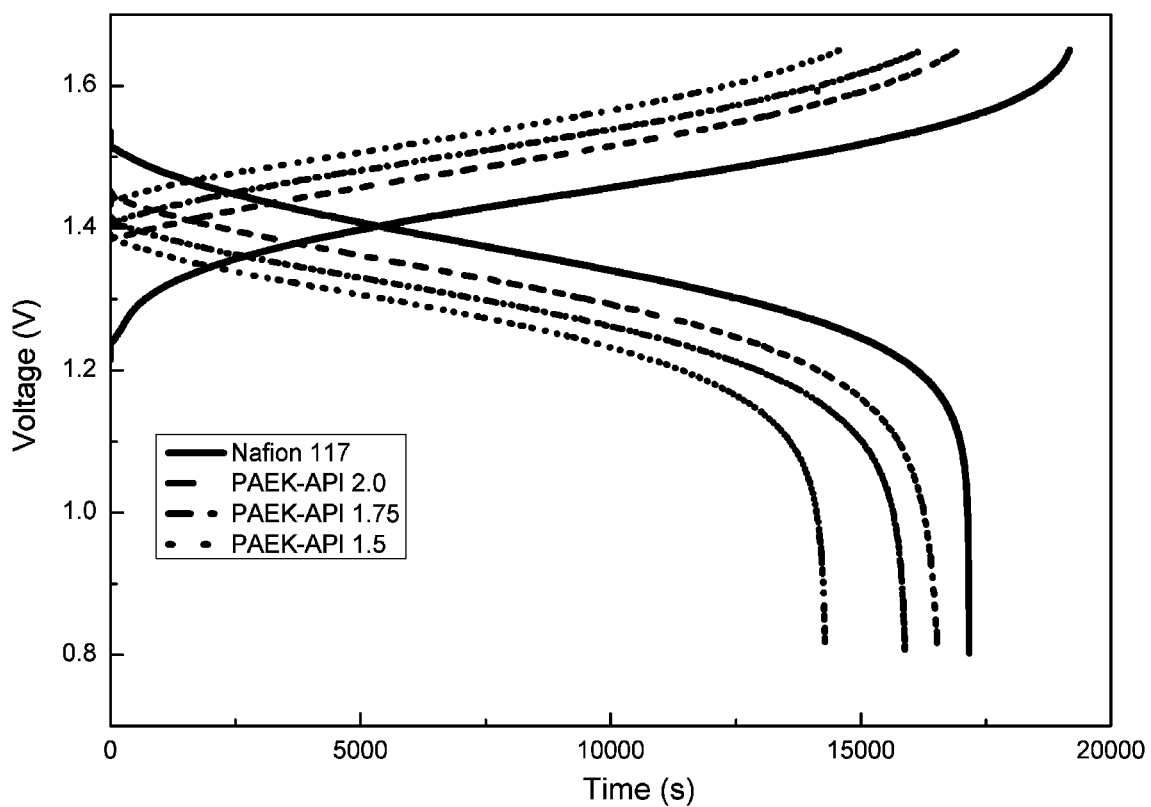
FIG. 4 is a diagram showing a charge-discharge curve of a vanadium redox flow battery (VRFB) having the anion exchange membrane according to the Example of the present disclosure.

Specifically, a charge/discharge curve of the vanadium redox flow battery (VRFB) having the anion exchange membrane is shown in FIG. 4. The charge efficiency (CE), voltage efficiency (VE), and energy efficiency (EE) related to the charge/discharge curve are shown in Table 3 below.

TABLE 3

| Anion exchange membrane | CE (%) | VE (%) | EE (%) |
|---|---|---|---|
| Example 1 (PAEK-API 2.0) | 96.4 | 86.5 | 83.4 |
| Example 2 (PAEK-API 1.75) | 96.6 | 83.8 | 81.0 |
| Example 3 (PAEK-API 1.5) | 96.7 | 82.1 | 79.4 |
| Nafion ® 117 | 89.5 | 92.1 | 82.4 |

Referring to FIG. 4 and Table 3, all of the anion exchange membranes of Examples 1 to 3 exhibited high charge efficiency (CE>96.4%) higher than that of the Nafion membrane (89.5%). This is because the anion exchange membrane according to each of Examples of the present disclosure has a lower permeability of vanadium ions therethrough, compared to that of the Nafion membrane, so that the self-discharge does not occur.

On the contrary, regarding the voltage efficiency (VE) highly related to the resistance of the membrane, that is, ionic conductivity, the anion exchange membrane of each of Examples 1 to 3 has ionic conductivity lower than that the Nafion membrane, and thus has the lower voltage efficiency (VE).

Further, the energy efficiency (EE) of Example 1 (PAEK-API 2.0) in which the molar ratio of PAEK and API was 1:2.0 was 83.4% which was higher than 82.4% of the Nafion membrane. This is believed to be due to the fact that Example 1 has a slightly lower voltage efficiency (VE) than that of the Nafion membrane, but has higher current efficiency (CE) that of the Nafion membrane.

That is, the anion exchange membrane of Example 1 according to the present disclosure among all of the ion exchange membranes exhibited the highest energy efficiency (83.4%) and has excellent electrical efficiency (EE).

Figure 5:
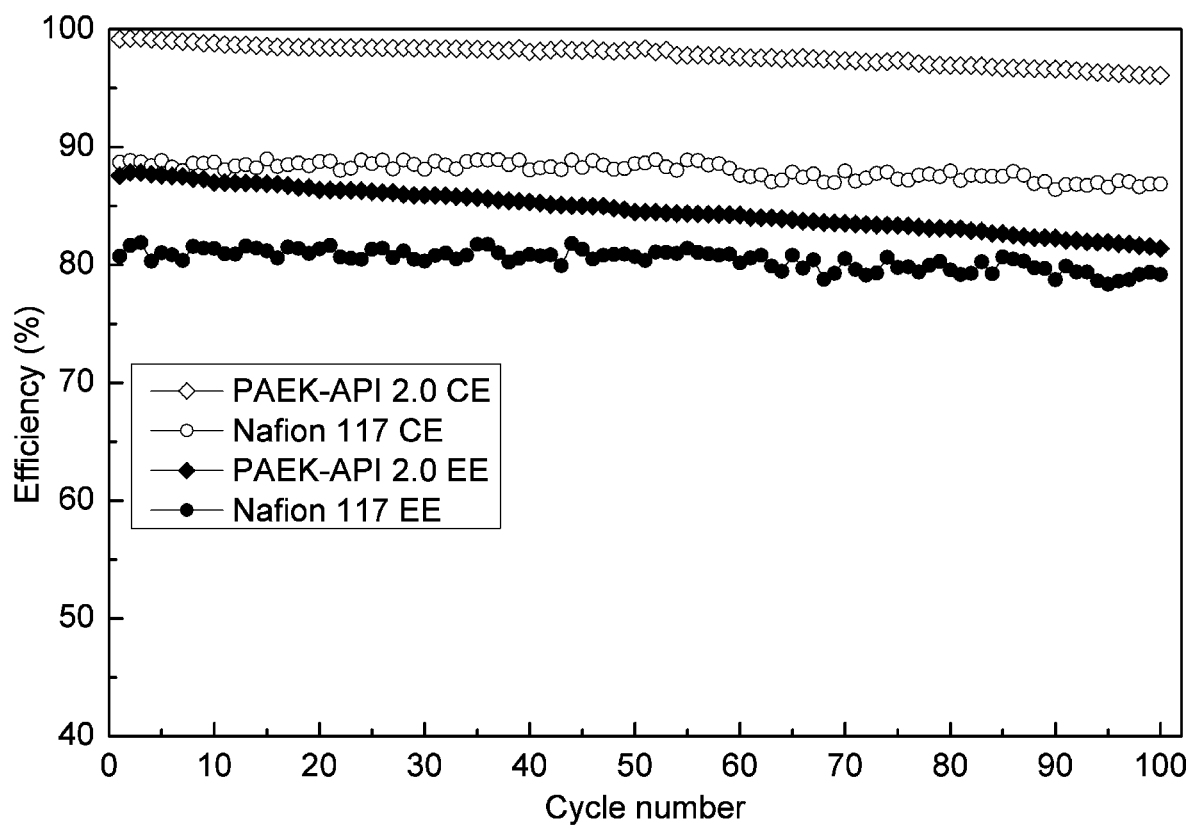
FIG. 5 is a diagram showing energy efficiency (EE) and current efficiency (CE) after 100 charge/discharge cycles at current density 40 mA $cm^{-2}$ of each of a Nafion membrane and the anion exchange membrane according to Example according to the present disclosure.

FIG. 5 is a diagram showing energy efficiency (EE) and current efficiency (CE) after 100 charge/discharge cycles at current density 40 mA $cm^{-2}$ of each of a Nafion membrane and the anion exchange membrane according to Example according to the present disclosure.

Referring to FIG. 5, during 100 charge/discharge cycles, the anion exchange membrane of Example 1 maintained high current efficiency and energy efficiency, compared to the Nafion membrane, and had little decrease in the current efficiency and energy efficiency. Thus, it may be seen that the anion exchange membrane according to Examples according to the present disclosure not only maintains high efficiency, but also has strong durability.

Description of the presented embodiments is provided so that a person having ordinary skill in the technical field according to the present disclosure may use or implement the present disclosure. Various modifications to these embodiments will be apparent to those of ordinary skill in the technical field according to the present disclosure. The general principles defined herein may be applied to other embodiments without departing from the scope according to the present disclosure. Thus, the present disclosure is not limited to the embodiments presented herein, but should be interpreted in the widest scope consistent with the principles and novel features presented herein.

What is claimed is:

1. An anion exchange membrane based on an aromatic polymer functionalized with an imidazolium group, the membrane containing a compound represented by a following Chemical Formula 1:

[Chemical Formula 1]

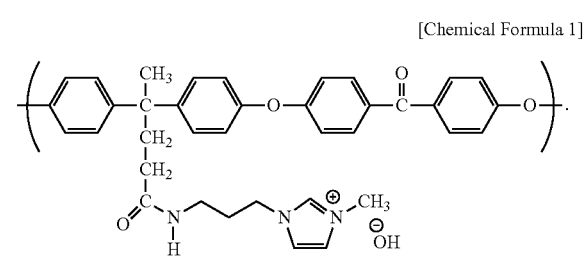

2. The anion exchange membrane of claim 1, wherein an ion exchange capacity (IEC) of the anion exchange membrane is in a range of 1.2 to 1.5 meq/g.

3. The anion exchange membrane of claim 1, wherein the anion exchange membrane has permeability of vanadium ions ($VO^{2+}$) therethrough in a range of 1.2 to 2.0 $10^{-7}$ $cm^2$/min.

4. The anion exchange membrane of claim 1, wherein the anion exchange membrane has a thickness in a range of 120 to 140 μm.

5. A method for preparing an anion exchange membrane based on an aromatic polymer functionalized with an imidazolium group, the method comprising:
reacting polyarylene ether ketone (PAEK) represented by a following Chemical Formula 2 and 1-(3-aminopropyl)imidazole (API) represented by a following Chemical Formula 3 with each other to obtain a reaction product, and adding iodomethane (CH₃I) thereto to activate an imidazolium group therein;
immersing the product having the activated imidazolium group into sodium hydroxide solution to substitute iodine ions (I⁻) with hydroxide ions (OH⁻) to synthesize a compound represented by a following Chemical Formula 1; and
forming a membrane containing the compound represented by the following Chemical Formula 1:

[Chemical Formula 1]

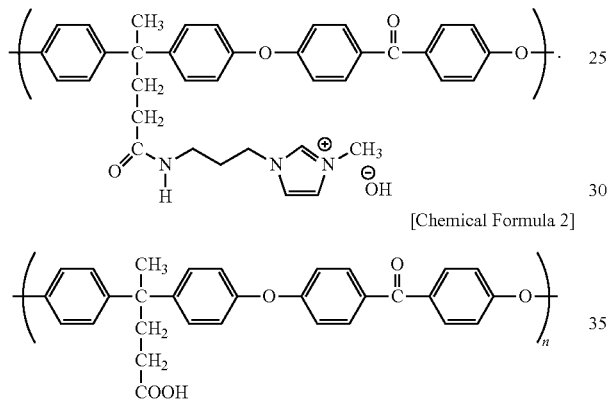

[Chemical Formula 2]

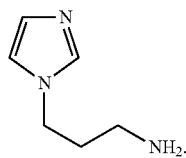

wherein in the Chemical Formula 2, n is an integer of 65 to 95,

[Chemical Formula 3]

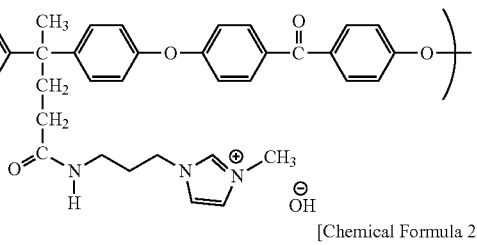

6. The method of claim 5, wherein when reacting polyarylene ether ketone (PAEK) and 1-(3-aminopropyl) imidazole (API) with each other, a molar ratio between a content of polyarylene ether ketone (PAEK) and a content of 1-(3-aminopropyl) imidazole (API) is in a range of 1:1.5 to 2.0.

7. The method of claim 5, wherein when reacting polyarylene ether ketone (PAEK) and 1-(3-aminopropyl) imidazole (API) with each other, a molar ratio between a content of polyarylene ether ketone (PAEK) and a content of 1-(3-aminopropyl) imidazole (API) is 1:2.0.

8. A method for preparing an anion exchange membrane based on an aromatic polymer functionalized with an imidazolium group, the method comprising:
reacting polyarylene ether ketone (PAEK) represented by a following Chemical Formula 2 and N-hydroxysuccinimide (NHS) represented by a following Chemical Formula 4 to synthesize an intermediate compound represented by a following Chemical Formula 4-1;
reacting the intermediate compound with 1-(3-aminopropyl)imidazole (API) represented by a following Chemical Formula 3 to obtain a reaction product, and adding iodomethane (CH₃I) thereto to activate an imidazolium group therein;
immersing the product having the activated imidazolium group into sodium hydroxide solution to substitute iodine ions (I⁻) with hydroxide ions (OH⁻) to synthesize a compound represented by a following Chemical Formula 1; and
forming a membrane containing the compound represented by the following Chemical Formula 1:

[Chemical Formula 1]

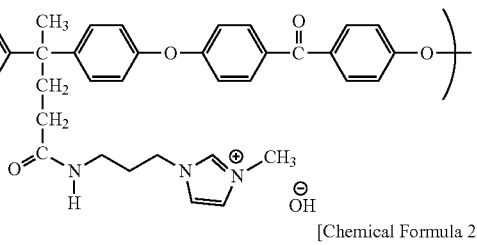

[Chemical Formula 2]

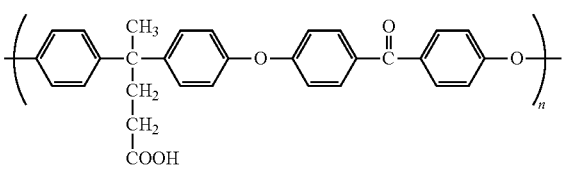

wherein in the Chemical Formula 2, n is an integer of 65 to 95,

[Chemical Formula 3]

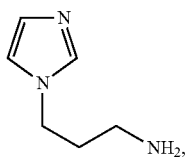

[Chemical Formula 4]

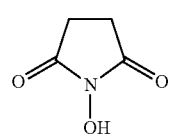

[Chemical Formula 4-1]

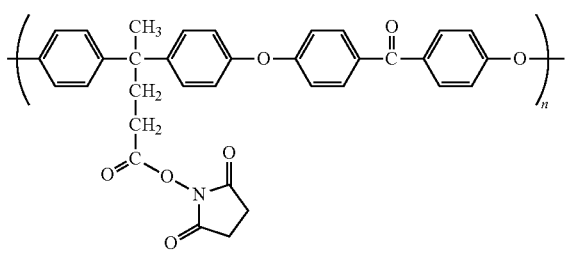

wherein in the Chemical Formula 4-1, n is an integer of 65 to 95.

9. The method of claim 8, wherein when reacting the intermediate compound and 1-(3-aminopropyl)imidazole (API) with each other, a molar ratio between a content of the intermediate compound and a content of 1-(3-aminopropyl) imidazole (API) is in a range of 1:1.5 to 2.0.

10. The method of claim 8, wherein when reacting the intermediate compound and 1-(3-aminopropyl)imidazole (API) with each other, a molar ratio between a content of the intermediate compound and a content of 1-(3-aminopropyl) imidazole (API) is 1:2.0.

11. The method of claim 8, wherein polyarylene ether ketone (PAEK) and N-hydroxysuccinimide (NHS) react with each other under presence of dicyclohexylcarbodiimide (DCC), thereby to synthesize the intermediate compound.

12. The method of claim 5, wherein polyarylene ether ketone (PAEK) is synthesized via reaction between compounds represented by a following Chemical Formula 2-1 and Chemical Formula 2-2, respectively:

[Chemical Formula 2-1]

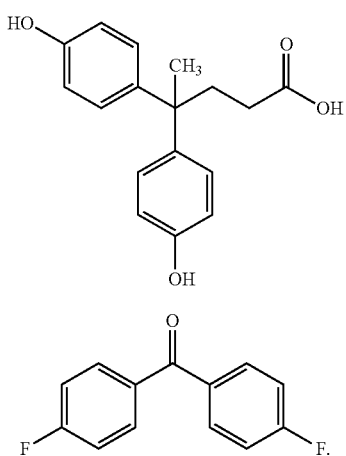

[Chemical Formula 2-2]

13. The method of claim 8, wherein polyarylene ether ketone (PAEK) is synthesized via reaction between compounds represented by a following Chemical Formula 2-1 and Chemical Formula 2-2, respectively:

[Chemical Formula 2-1]

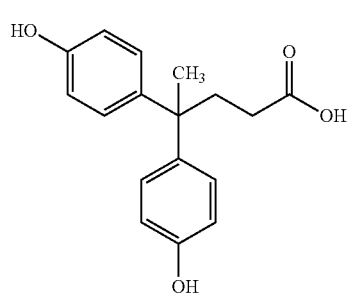

[Chemical Formula 2-2]

14. The method of claim 5, wherein the reaction between polyarylene ether ketone (PAEK) and 1-(3-aminopropyl) imidazole (API) occurs in a dimethylacetamide (DMAc) solvent.

15. The method of claim 8, wherein the reaction between the intermediate compound and 1-(3-aminopropyl) imidazole (API) occurs in a dimethylacetamide (DMAc) solvent.

* * * * *